March 16, 1965 R. L. SOHN 3,173,626
ATTITUDE STABILIZATION OF SPACECRAFT
Filed July 30, 1962 2 Sheets-Sheet 1
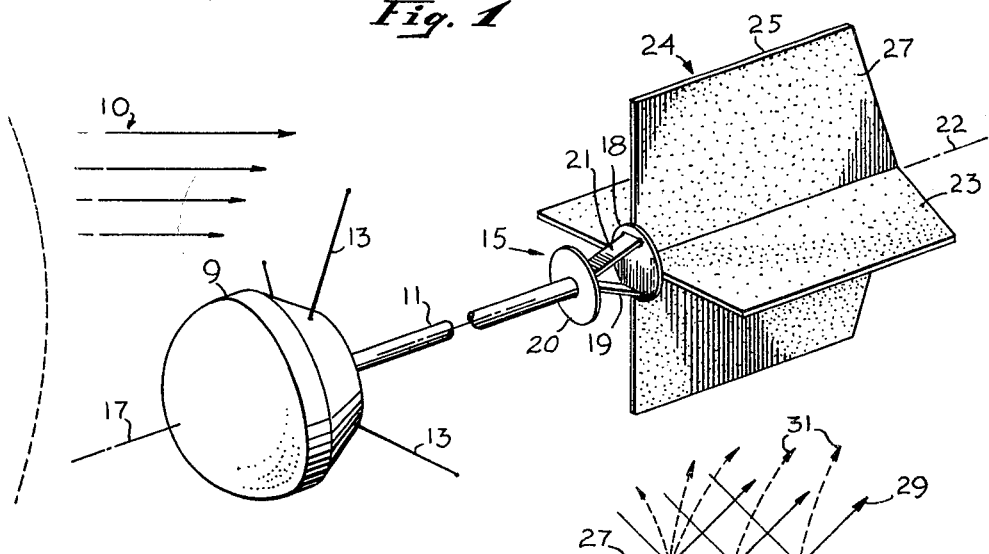
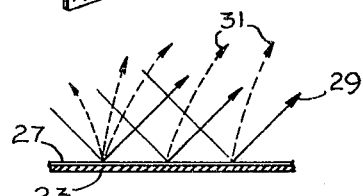
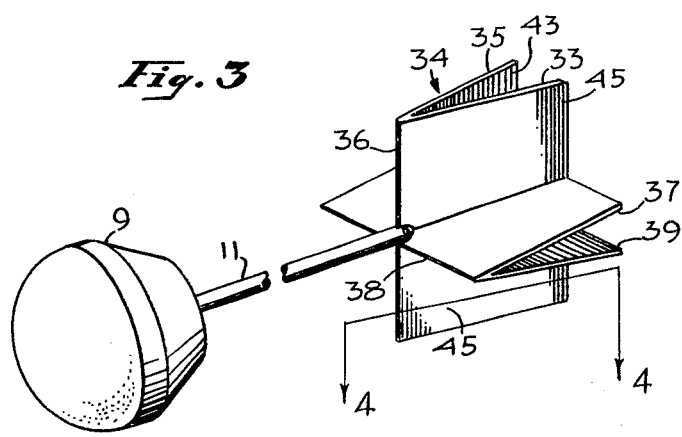
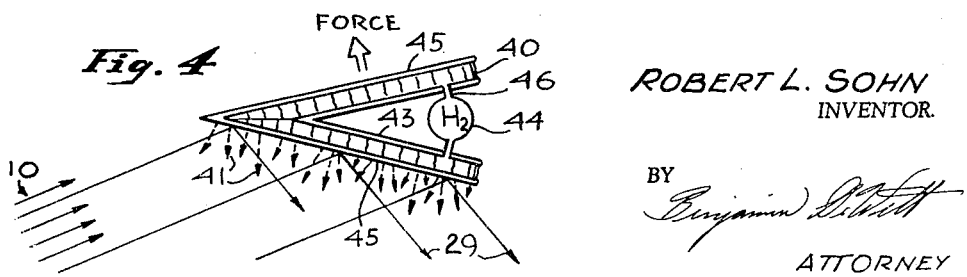
ROBERT L. SOHN
INVENTOR.
BY
ATTORNEY March 16, 1965 R. L. SOHN 3,173,626
ATTITUDE STABILIZATION OF SPACECRAFT
Filed July 30, 1962 2 Sheets-Sheet 2

ROBERT L. SOHN
INVENTOR.

BY
ATTORNEY

United States Patent Office 3,173,626
Patented Mar. 16, 1965

3,173,626
ATTITUDE STABILIZATION OF SPACECRAFT
Robert L. Sohn, Santa Monica, Calif., assignor, by mesne assignments, to Thompson Ramo Wooldridge Inc., Cleveland, Ohio, a corporation of Ohio
Filed July 30, 1962, Ser. No. 213,500
3 Claims. (Cl. 244—1)

This invention relates to systems and apparatus for attitude control of spacecraft and more particularly to apparatus for generating attitude controlling forces by evaporation or transpiration of gaseous material from surfaces with such evaporation or transpiration being controlled by the intensity of impinging radiation. One apparatus of the general class to which the present invention relates is described in my Technical Paper entitled, "Stabilizaton of Space Vehicles by Means of Gas Diffusing Surfaces," American Astronautical Society, Sheraton-Palace Hotel, San Francisco, California, August 1961.

In many applications it is desirable to maintain a spacecraft in a predetermined orientation with respect to the sun or another source of electromagnetic radiation. For example, in the spacecraft art it is common practice to provide arrays of solar cells for generating electrical power for use in the vehicle. Reliable and efficient operation of such an array requires that the vehicle be accurately oriented or positioned relative to the impinging solar radiation. Likewise, during lunar or interplanetary flights it might be required to maintain a constant vehicle attitude for various known reasons. If disturbing torques such as solar radiation pressures or gravitational eccentricities cause the vehicle to rotate away from the desired orientation, a suitable corrective torque must be applied to right the vehicle. Generally, in the prior art a fluid jet or magnetic torque producing device of some type has been used to supply the required restoring moment. Even though the disturbing torques are small, it is readily apparent that fluid jets cannot be used for long periods of time without consuming large quantities of propellant material. In addition, substantially all of the prior art attitude control systems utilize several moving parts which add to the complexity and hence deteriorate the reliability of the spacecraft system.

In my copending application Serial Number 215,501, filed July 30, 1962 (STL–482), there is described an attitude control system which utilizes weather vane-like stabilizer elements or "solar sails" arranged to generate vehicle orienting torques in response to impingement of solar radiation. One great virtue of the solar sail concept is that it involves purely passive control apparatus and hence does not give rise to the malfunction probabilities of conventional devices which notoriously utilize multiple mechanical movements, electrical circuits, and the like.

Previous systems utilizing the above described solar sail concept have been of limited acceptability for spacecraft such as communication satellites for the reason that the achievable reactive forces have been limited by the avialable radiation pressure, i.e., the reflected momentum of impinging photons.

Accordingly, it is a primary object of this invention to provide an improved apparatus for generating reactive forces several times greater than those obtainable from solar radiation pressure alone.

It is another object of this invention to provide an improved apparatus wherein impinging radiation is utilized to regulate the efflux of propulsion material and thereby control the magnitude of reaction forces which are exerted on the vehicle as a result of that efflux.

It is an additional object of this invention to provide an improved attitude control system for spacecraft which derives its motivating energy from solar radiation, which provides orienting forces or torques dependent upon the angle of misalignment of the spacecraft relative to its desired orientation, and which provides orienting forces at least about an order of magnitude greater than the forces obtainable by mere reflection of solar radiation.

It is a general object of this invention to provide an improved spacecraft attitude control system of reduced weight and bulk and which does not utilize or require relatively moving metal surfaces or electrical power or circuitry.

It is another general object of this invention to provide a completely passive spacecraft attitude control system in which restoring torques are generated in response to and in proportion to angular misalignment without the use of auxiliary sensors, electronics, valves, relatively moving metal surfaces, or the like.

The general principles of spacecraft attitude control by means responsive to impinging radiation pressure are disclosed in my aforementioned copending application. The present invention goes beyond that copending application and includes systems and apparatus wherein the radiation pressure is supplemented by, and used to control, gas particle emission or expulsion from the surface of the stabilization sail. In accordance with the present invention, the rate and velocity of gaseous material expulsion from the sail surface is at least in part dependent upon the temperature of the surface. Since the temperature of the surface is governed by the angle of orientation of the surface relative to the sun's rays, it follows that the gas particle efflux rate and the resulting reaction force will vary as a function of the orientation angle. In accordance with preferred embodiments of the present invention, a major portion of the reaction force is developed by the efflux momentum of the gaseous material rather than by the reflected momentum of the impinging photons.

The novel features that I consider characteristic of my invention are set forth with particularity in the appended claims. The invention itself, however, both as to its organization and its method of operation together with additional objects and advantages thereof, will best be understood from the following description of specific embodiments when considered in connection with the accompanying drawing, in which:

FIGURE 1 is a perspective view of a spacecraft in accordance with one embodiment of my invention;

FIGURE 2 is a fragmentary view of a portion of the apparatus of FIGURE 1;

FIGURE 3 is a perspective view of a spacecraft in accordance with a further embodiment of my invention;

FIGURE 4 is a sectional view taken along the lines 4—4 of FIGURE 3;

Figure 5:
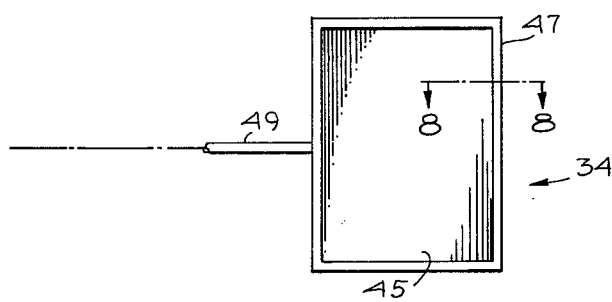
FIGURE 5 is an elevational or side view of the solar sail assembly of the apparatus of FIGURE 3 but with certain portions omitted for clarity.

Referring now to FIGURES 1 and 2 of the drawing, a spacecraft system in accordance with one embodiment of my invention is constituted by a payload or vehicle 9 located in a position in space such that it is illuminated by electromagnetic radiation 10 emanating from the sun or another star. A predetermined axis of the spacecraft is indicated by the numeral 17. While in the configuration illustrated the axis 17 is the axis of symmetry of the spacecraft 9, it should be understood that such is not necessarily the case but that any axis of the spacecraft might be selected as the axis which is desired to be oriented parallel to the electromagnetic rays 10. As shown in FIGURE 1, the spacecraft has an orientation corresponding to an arbitrary amount of misalignment from the desired orientation. Spaced from the vehicle 9 and supported relative thereto by means of spacecraft boom 11 there is provided a solar sail assembly 24 including a first sail panel 23 and a second sail panel 25, which are positioned at right angles to one another and which intersect with one another along an axis 22 which may be conveniently referred to as the axis of symmetry of the sail assembly. The sail assembly is connected to the right-hand end of the spacecraft boom 11 by means of a trapezoidal linkage assembly 15 comprising circular plates 18 and 20 and at least one pair of nonparallel metal straps 19 and 21. For present purposes it is sufficient to note that the linkage 15 comprises an attachment means for connecting the sail assembly 24 to the spacecraft boom 11 and for enabling variation of the angle between the vehicle axis 17 and the sail assembly axis 22. Further, in accordance with preferred embodiments of this invention, the linkage 15 comprises radiation sensitive control means for proportionally varying that inter-axis angle in a manner such that the misalignment of the sail assembly 24 relative to the impinging radiation 10 is continually different from the misalignment of the spacecraft 9 by a factor corresponding to the position and rate of change of the spacecraft misalignment. The structure and function of the linkage 15 is disclosed in further detail and claimed in my aforementioned copending application Serial Number 215,501. Reference may be had thereto for a further understanding of this latter aspect of the apparatus. In accordance with one embodiment of the present invention, the external surfaces of the sail panels 23 and 25 are formed or coated with a layer 27 of evaporative material. Specifically, I prefer to use an evaporative metal such as magnesium for the surface 27 of the sail panels. As will be noted in more detail hereinafter, other similar materials such as zinc, tellurium, magnesium, and palladium may also be used.

Operation of the apparatus of FIGURES 1 and 2 is substantially as follows. When the vehicle axis 17 is misaligned relative to the impinging radiation 10 as shown in FIGURE 1, the radiation falls on the uppermost surface of the panel 23 and heats that surface to a temperature dependent upon the intensity of the radiation 10 and the angle of incidence. The photons 29 reflected from the surface of the sail panel exert a force thereon corresponding to the reflected momentum of the impinging photons; however, that force is relatively small. In accordance with the present invention, a much greater reaction force is applied to the sail panel 23 by evaporation of the surface material 27 and expulsion of the evaporating gas molecules 31. When the sail is in a neutral or properly oriented position so that direct sunlight cannot impinge upon the sail, the surface temperature of the sail panel 23 is relatively low and little if any of the surface material 27 is expelled by evaporation. Moreover, when the vehicle is properly aligned, the upper and lower surfaces of the panel 23 have the same temperature so that any evaporation which occurs will be equal from both sides of the panel with the result being that no net force or torque is generated. When the entire spacecraft system is angularly displaced or misaligned so that the sail is rotated into the sunlight as shown in FIGURE 1, the temperature of the top surface of sail panel 23 increases by two hundred or three hundred degrees Fahrenheit, depending upon the angle of incidence of solar radiation; more nearly normal incidence angles result in still higher temperature. The sail surface 27 then tends to evaporate, and the directed momentum of the effluxing particles 31 away from the surface results in a reactive force that tends to restore the sail assembly 24 (and the vehicle) to a neutral position. Essentially, the stabilizing force or torque is now provided by the efflux of atoms or molecules, rather than by the reflection of photons as in the apparatus of my aforementioned copending application.

It will be appreciated that different sail surface materials provide different degrees of reactive force depending on their evaporation rates at a particular temperature. Evaporation rates for several materials are given by Table I.

*Table I*

| Material | Atomic Number | Density (lb./cu. ft.) | Evaporation Temperatures (° F.) | | | Melting Temperature (° F.) |
|---|---|---|---|---|---|---|
| | | | $10^{-5}$ cm./yr. | $10^{-3}$ cm./yr. | $10^{-1}$ cm./yr. | |
| Zinc | 30 | 455 | 160 | 260 | 350 | 790 |
| Tellurium | 52 | 390 | 260 | 350 | 430 | 840 |
| Magnesium | 12 | 109 | 260 | 350 | 460 | 1,200 |
| Manganese | 25 | 450 | 845 | 1,010 | 1,200 | 2,300 |
| Palladium | 46 | 759 | 1,490 | 1,720 | 2,020 | 2,840 |

The first three elements of Table I exhibit relatively high evaporation rates at low temperatures, well within the temperature range attainable by solar heating in a space environment. For example, table one indicates in column 6, item 2 that a homogenous plate of tellurium, having one surface exposed to a space-like vacuum and held at a temperature of 430° Fahrenheit will erode or evaporate at a rate such that the thickness decreases by approximately one millimeter in a year's time. The temperatures required to evaporate material from the sail surface 27 at an evaporation rate of one millimeter per year are considerably below the melting temperatures of the elements. It is noted that material losses greater than a thickness of about one millimeter per year would be undesirable because of the possibility of deep pitting due to irregularities in material properties.

The momentum of the effluxing particles provides a reaction force, acting on the sail assembly 24, which augments the normal "solar sail" force generated by reflection of the impinging photons 29. As will be demonstrated more particularly hereinafter this supplementary reaction force preferably is several times larger than the conventional "solar sail" force provided by reflection of the photons 29. Accordingly, the present invention enables generation of reactive forces several orders of magnitude larger than the forces attainable from solar radiation pressure alone. Stated another way, the conventional solar radiation force can be augmented by an augmentation ratio as large as 10 or more.

As the particles of the evaporated surface material leave the surface, a reaction force is imparted to the surface that is equal and opposite to the time rate of change of efflux momentum of the particles. By computing this efflux momentum, the degree of augmentation available through evaporation can be determined. Assuming that the particles possess a thermal energy that is proportional to the temperature of the surface of the material, the mean (R.M.S.) velocity of the particles is given by:

$$v = \sqrt{\frac{3RT}{m}}$$

where $R$=universal gas constant, $T$=absolute temperature, and $m$= molecular weight. If $v$ is in feed per second and T in degrees Rankine, the above relation relation reduces to $$v = 386\sqrt{\frac{T}{m}} \text{ (feet per second)}$$

The individual particles leave with a total momentum that is equal to the product of the velocity and the mass; the time rate of change of momentum is thus, $$\dot{M} = \left(\frac{\dot{W}}{g}\right)v$$

where $v$ is the mean velocity of the effluxing particles, and $g$ is the constant of gravitation. Not all of the particles depart in a direction normal to the surface 27. Hence, in general the efflux momentum will have components lateral as well as normal to the surface. The lateral components of the reaction force do not contribute to a useful restoring torque. Accordingly, the force component normal to the sail surface 27 is the parameter of interest. An expression for the normal component can be derived by assuming a distribution law for the direction of departure. Such a distribution is given by Lambert's cosine law which states that the rate of efflux in any direction is less than the efflux in the normal direction by a factor of the cosine of the angle between the given direction and the normal; that is, $\dot{W}\theta = \dot{W}_n \cos\theta$ where $\dot{W}\theta$ is the local flow rate. By integrating over the entire hemisphere of possible efflux directions, it can be shown that the average particle flow rate per unit of surface area is one half that of the peak rate in the normal direction; that is, $$\dot{W} = \frac{1}{2}\dot{W}_n$$

Further, assuming that a group of particles leaving in any arbitrary direction $\theta$ has the same velocity distribution as other groups leaving in different directions, it becomes apparent that fewer particles leave in the lateral directions and that a maximum number leave in the normal direction. An integration of $\dot{W}\theta v$ in a particular direction gives the local pressure against a container at that point.

It is necessary to determine the time rate of change of momentum normal to the surface. Using Lambert's cosine law, the time rate of change of momentum in the normal direction is $$\dot{M}_n = \frac{2}{3}\frac{\dot{W}v}{g}$$

This expression gives the force normal to the surface 27 per square foot of surface, provided that the particle flow rate applies to the same unit of area.

The degree of augmentation can be estimated for the materials listed in Table I by using the expressions for velocity and momentum described previously. A particle flow rate that is compatible with a surface evaporation rate of one millimeter per year is used; in comparing the ratio of thrust attainable by evaporation to that attainable through solar radiation pressure alone, a solar radiation pressure of $1.67 \times 10^{-7}$ pounds per square foot is used. The relative stabilizing forces provided by the apparatus of the present invention are given by column 4 of Table II.

*Table II*

| Metal | Evaporation Temperature (° F.) | Melting Temperature (° F.) | Force Normal To Surface (lbs./sq. ft.) | Force, Solar Pressure | Force, Flow Rate (sec.) |
| --- | --- | --- | --- | --- | --- |
| Zinc | 350 | 790 | $1.328 \times 10^{-6}$ | 7.95 | $.892 \times 10^{-6}$ |
| Tellurium | 430 | 840 | .854 | 5.12 | .667 |
| Magnesium | 460 | 1,200 | .555 | 3.32 | 1.390 |
| Manganese | 1,200 | 2,300 | 2.060 | 12.33 | 1.220 |
| Palladium | 2,020 | 2,840 | 3.040 | 18.20 | 1.540 |

The results show that, with an evaporation rate of one millimeter per year, augmentation ratios of 3.3 to 18.2 possibly can be achieved. In practice it is doubtful that a palladium surface can be maintained at two thousand and twenty degrees Fahrenheit in a passive solar environment; hence, the high augmentation ratio (18.2) is perhaps too optimistic. Magnesium offers nearly the highest augmentation ratio per pound of metal evaporated per year (high specific impulse). Further, its operating temperature is significantly below that of palladium. By allowing a slightly higher temperature (four hundred and eighty five degrees Fahrenheit) and a deeper evaporation (three millimeters per year), an augmentation ratio of ten can be achieved with a magnesium surface. Approximately 1.08 pounds of magnesium will evaporate per year per square foot of surface assuming that the surface 27 is maintained normal to the solar radiation at all times. In actual practice the surface 27 is nearly parallel to the solar radiation most of the time so that the evaporation losses are a fraction of the 1.08 pounds per square foot.

In summary, spacecraft stabilization by means of evaporating surfaces (preferably magnesium) offers a factor of ten amplification of normal force or torque compared to that available from a basic solar sail stabilizer of the type described in my aforementioned copending application.

In accordance with a further embodiment of my present invention, amplification or augmentation of the reactive forces produced by impinging radiation is accomplished by controlled diffusion of gas through the external surfaces of a solar sail. More specifically and as shown in FIGURE 3, a spacecraft 9 carries, at the end of the boom 11, a sail assembly 34 comprised of a vertical or yaw controlling sail member 36 and a generally horizontal pitch controlling said sail member 38. It will be understood that, in a preferred form, the apparatus illustrated in FIGURE 3 may and preferably should include an anti-hunt control linkage substantially the same as that shown in FIGURE 1 and designated by the reference numeral 15. The V-shaped members 36 and 38 are arranged generally perpendicular to one another and intersect in a manner to provide an assembly which is symmetrical about the center axis. In accordance with this preferred embodiment of the present invention, the first and second legs 33 and 35 of the vertical sail member are both provided with an external surface of a metal through which a low molecular weight gas may be diffused. The first and second legs 37 and 39 of the horizontal sail member 38 are provided with a similar external surface. The internal surface 43 of each and every leg portion of the sail assembly is preferably formed of a material which is substantially impervious to transpiration of gas from the interior of the sail members. Preferably, the inside or inactive surfaces 43 are formed of a metal such as steel and externally coated with a layer of glass to impede transpiration of gas. As shown in FIGURE 4, the interior structure of the sail members preferably comprises a relatively rigid honeycomb-like member 40 which is sandwiched between the exterior panel 45 and the gas impervious inactive panel 43. Preferably, the honeycomb member 40 is made of steel to provide maximum strength and rigidity. Such honeycomb structural members are well known in the aeronautics arts. It is contemplated that almost any of the conventional honeycomb plates which are used in those arts will suffice for the apparatus of the present invention provided that the specific surface panels 43 and 45, as described above, are used.

A gas storage reservoir 44 is provided at a convenient location in the space vehicle and is connected to each and every one of the sail panels by means of conduits 46 as schematically shown in FIGURE 4. Preferably, in accordance with the present invention, the gas reservoir 44 is mounted or carried on the vehicle 9 at a point near the place where the boom 11 attaches to the vehicle 9. By so locating the gas reservoir, it is maintained in the shadow of the vehicle 9 when the axis 17 is aligned with the solar rays 10. By that arrangement it is possible to use a reservoir which stores the propellant gas in its liquid form and the reservoir 44 may be sufficiently insulated so that its rate of gas evaporation closely approximates the rate at which the gas diffuses through the external surfaces 45 of the sail panels.

As shown in FIGURE 4, the solar radiation 10 impinging on the external surface of the honeycomb sail member is reflected therefrom as indicated at 29. The impinging radiation heats the sail surface to a temperature dependent on the angle of incidence of the radiation 10.

The rate at which the gas diffuses through the thin surface 45 depends on the temperature of that surface. The directed momentum of effluxing gas particles 41 away from the sail surface 45 results in a reactive force that tends to restore the sail assembly and the vehicle to a neutral position, that is, a position in which the axis of symmetry of the sail assembly is aligned with the solar radiation 10. Since the rate of gas transpiration is dependent on the temperature of the sail surface, the restoring force or torque generated by the sail assembly is proportional to the temperature of the external surface 45 and therefore is dependent upon the angle of incidence of the impinging radiation. As the radiation becomes more nearly normal to the surface, its intensity per unit area of the surface increases, the temperature of the surface increases correspondingly, and the gas transpiration rate increases.

Figure 6:
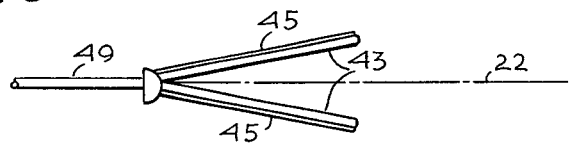
FIGURE 6 is a plan view of the structure illustrated in FIGURE 5.
Figure 7:
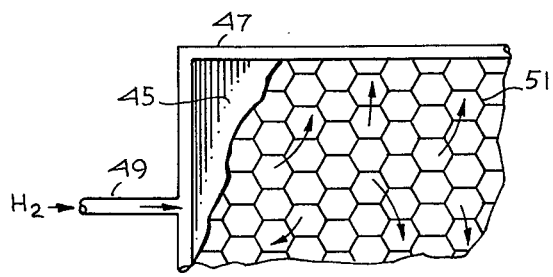
FIGURE 7 is an enlarged fragmentary view of a portion of the apparatus illustrated in FIGURES 3 and 5.
Figure 8:
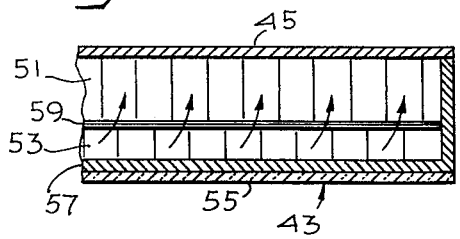
FIGURE 8 is a cross-sectional view taken along the lines 8—8 of FIGURE 5.

In FIGURES 5, 6, and 7 there is shown a single V-shaped sail member corresponding to the vertical sail member 36 of FIGURE 3. In this illustration, the other or horizontal sail member is omitted for clarity of illustration. According to this embodiment of my invention, the external surface 45 of the sail member is preferably formed of a thin sheet (about 0.010 inch thick) of palladium. Again, the sail panel is a honeycomb sandwich structure with the inside or rear surface being glass coated steel, and with the structural member which is sandwiched between the surface panels 43 and 45 being a honeycomb steel panel or a similar foraminated panel of relatively high strength and rigidity as best shown in FIGURE 7. The sail member 34 is supported by spacecraft boom 49 which may include a fluid conduit (not shown) for supplying gas to the sail member. As shown in FIGURE 5, gas is equally supplied to all portions of the sail panel by a peripherally extending conduit portion 47 which is sealed to the outer edges of the panel sandwich and is provided with a plurality of apertures to permit the gas to flow from the conduit 47 to all portions of the honeycomb 51. In accordance with a further embodiment of the invention as shown in FIGURE 8, the said panel 34 of FIGURE 5 may alternatively be comprised of a first honeycomb member 51 which is the primary structural portion of the sail member and a secondary or auxiliary honeycomb member 53 from which hydrogen gas is fed to the primary honeycomb structure 51. In accordance with this embodiment, the gas permeable external surface 45 consists of a thin palladium plate which is cemented to the honeycomb structure 51. The inactive surface 43, consisting of a thin steel plate 57, and external glass layer 55 is secured to the outer side of auxiliary honeycomb 53. Since the walls of the cells in conventional honeycomb panels are relatively thin and since the rate of gas transpiration through the outer surfaces 45 is relatively low, it is possible to feed the gas from the supply conduit 47 to the peripheral portions of the auxiliary honeycomb 53 and it diffuses throughout the honeycomb structure. The auxiliary honeycomb 53 communicates with the primary honeycomb 51 through an intervening plate 59 which is gas permeable to about the same extent as the outer plate 45. Accordingly, the propellant gas can be maintained in equal pressure throughout the primary honeycomb 51. Further, it is apparent that should a micrometeorite or other high energy particle, sometimes encountered in a space environment, puncture the outer surface 45, serious leakage of gas would be prevented by the double-walled construction of the sail; that is, surface 59 would then impede rapid efflux of hydrogen.

The operation of the embodiments of FIGURES 3 through 8 is substantially as follows. When a gas (preferably hydrogen) is introduced into the honeycomb core 51 under a pressure of about five atmospheres, the gas eventually diffuses through the palladium outer surface 45 by absorptive transpiration and escapes into the space environment. The rate of transpiration of the gas is dependent on the pressure inside the honeycomb core 51, and on the thickness and temperature of the outer surface 45. The gas particles leave the surface 45 with some velocity, $v$, dependent upon the plate temperature and create a reactive force on the plate similar to that described heretofore with reference to the embodiment shown in FIGURES 1 and 2. The embodiments shown in FIGURES 3 through 8 have several advantages. First, a much higher rate of gas particle efflux can be attained by transpiration of gas which is supplied at a substantial pressure. Moreover, the gas transpiration rate can be selected by selecting the thickness of the surface plate 45. Finally, a low molecular weight gas such as hydrogen can be used and will yield greater effluxing momentum rates per pound of material consumed than the system shown in FIGURES 1 and 2. The rate of diffusion is given by:

$$\dot{W} = 2.0 \times 10^{-9}(m)\frac{p}{t}Q_{ul} \text{ (pounds per second-square foot)}$$

where $t$ = plate thickness, millimeters; $p$ = gas pressure, atmospheres; $Q_{ul}$ = flow in microliters at zero degrees centigrade per minute per square centimeter of area per millimeter thickness at one atmosphere of pressure differential; and $m$ = molecular weight, grams per gram mole. When the hydrogen particles reach the vacuum or space side of the palladium plate 45, they enter into the desorption phase and those particles which have more than a certain minimum energy (as predicted by the Maxwellian velocity distribution law), leave the surface and escape into space. This minimum energy is exactly equal to the adsorption energy. The influence of this minimum energy for escape (desorption energy) on the reactive force generated by the effluxing particles is relatively small. It is important to note, however, that in the case of a very thin plate 45, the diffusion and desorption process is largely controlled by plate temperature (which is a nearly uniform temperature from the inner to the outer surface). This fact is essential to the passive stabilizer that relies on solar heating for reactive force generation.

We can assume, as a first approximation, that the particles leave with a velocity given by $$v = \sqrt{\frac{3RT}{m}}$$

Not all of the particles leave normal to the surface 45; again, Lambert's cosine law is assumed for the directional distribution of effluxing particles. Combining the above expressions for diffusion flow rate and particle velocity with Lambert's distributional law, estimates of reactive force per square foot of stabilizer surface can be made for various gas-metal surface combinations. The results indicate that reactive forces several orders of magnitude greater than those attainable with solar radiation pressure alone can be achieved. A typical case is shown below.

*Table III*

| | |
|---|---|
| System materials | Hydrogen-palladium. |
| Gas pressure | 5 atmospheres (70 p.s.i.). |
| Plate thickness | 0.5 millimeter. |
| Plate temperature | 1229° R. |
| Force per square foot | $1.650 \times 10^{-3}$ pounds. |
| Force/solar pressure | $0.980 \times 10^4$. |

The hydrogen-palladium combination indicated by Table III is presently believed to be preferable because of its high force output at reasonably low temperatures. The temperature used in the above table is compatible with the equilibrium temperature of a palladium flat plate exposed to direct solar radiation in free space. In actuality, a stabilizer surface operates at low incidence angles so that the operating temperature of the plate would be considerably less than 1280° R. (820° F.).

The use of hydrogen as the gas which is to be diffused through the sail surfaces and the use of palladium as the outer plate or surface 45 of the sail members is presently preferred in systems of the type illustrated by FIGURES 3 through 8. However, the hydrogen-palladium combination is not essential to the present invention. I have determined that alternatively the combinations indicated in Table IV may be successfully used although perhaps with a lower efficiency.

*Table IV*

| Propellant gas: | Material of the external sail surface 45 |
|---|---|
| Nitrogen | Iron. |
| Hydrogen | Nickel. |
| Helium | Palladium. |
| Helium | Iron. |

For a full and detailed mathematical analysis and further expansion of the operative characteristics of my invention as described heretofore, reference may be had to my previously mentioned American Astronautical Society Technical Article entitled "Stabilization of Space Vehicles by Means of Gas Diffusing Surfaces." It is intended that said article is incorporated by reference herein.

While the present invention has been illustrated and described with reference to certain preferred embodiments only, it will be obvious to those skilled in the art that it is not so limited but is susceptible of various changes and modifications without departing from the spirit and scope thereof.

The embodiments of the invention in which an exclusive property or privilege is claimed are defined as follows:

1. In combination:
    an object which is desired to be maintained in a predetermined orientation;
    a member having a surface portion adapted to be oriented to receive electromagnetic radiation;
    said surface portion including at least one material which tends to evaporate when raised to temperatures within the temperature range attainable by solar heating in a space environment; and
    coupling means connecting said member to said object for applying torques to said object which correspond to the reaction force imparted to said member by the efflux momentum of material evaporated from said surface portion.

2. Apparatus for stabilizing the attitude of a spacecraft in accordance with claim 1 in which said one material is selected from the group comprising zinc, tellurium, magnesium, manganese, and palladium.

3. An attitude control arrangement comprising:
    an object which is desired to be maintained in a predetermined orientation relative to a source of electromagnetic radiation;
    radiation sail means coupled to control the orientation of said object for applying thereto an attitude altering force in response to transaxial impingement of radiation from said source; and
    said sail means including at least one external surface formed of material which evaporates when heated to a few hundred degrees Fahrenheit and provides an efflux of molecules with the effluxing molecules imparting a reaction force to said surface in proportion to the time rate of change of momeutm of the molecules.

No references cited.

FERGUS S. MIDDLETON, *Primary Examiner.*